United States Patent
Xu et al.

(10) Patent No.: US 9,443,289 B2
(45) Date of Patent: *Sep. 13, 2016

(54) COMPENSATING FOR MOTION INDUCED ARTIFACTS IN A PHYSIOLOGICAL SIGNAL EXTRACTED FROM MULTIPLE VIDEOS

(71) Applicant: Xerox Corporation, Norwalk, CT (US)

(72) Inventors: Beilei Xu, Penfield, NY (US); Lalit Keshav Mestha, Fairport, NY (US); Survi Kyal, Rochester, NY (US); Himanshu J. Madhu, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 573 days.

This patent is subject to a terminal disclaimer.

(21) Appl. No.: 13/923,612

(22) Filed: Jun. 21, 2013

(65) Prior Publication Data

US 2014/0376789 A1  Dec. 25, 2014

(51) Int. Cl.
*G06K 9/00* (2006.01)
*G06T 5/00* (2006.01)
*G06T 5/50* (2006.01)
*G06T 7/00* (2006.01)

(52) U.S. Cl.
CPC ............. *G06T 5/003* (2013.01); *G06T 5/50* (2013.01); *G06T 7/0016* (2013.01); *G06T 2207/10016* (2013.01); *G06T 2207/20201* (2013.01); *G06T 2207/30088* (2013.01)

(58) Field of Classification Search
None
See application file for complete search history.

(56) References Cited

U.S. PATENT DOCUMENTS

| | | | | |
|---|---|---|---|---|
| 9,036,877 B2* | 5/2015 | Kyal | ................... | A61B 5/7225 382/107 |
| 9,185,353 B2* | 11/2015 | Mestha | ................... | H04N 7/18 |
| 2007/0024946 A1* | 2/2007 | Panasyuk | ............. | A61B 5/0059 359/253 |
| 2008/0077020 A1* | 3/2008 | Young | .................. | A61B 5/0205 600/484 |
| 2009/0203972 A1* | 8/2009 | Heneghan | ............ | A61B 5/0507 600/301 |
| 2009/0318815 A1* | 12/2009 | Barnes | ................ | A61B 5/0062 600/473 |
| 2009/0326383 A1* | 12/2009 | Barnes | ................ | A61B 5/0059 600/476 |
| 2010/0152600 A1* | 6/2010 | Droitcour | ................ | A61B 5/05 600/534 |
| 2013/0066135 A1* | 3/2013 | Rosa | ........................ | A61N 5/10 600/1 |

(Continued)

OTHER PUBLICATIONS

Poh et al., "Noncontact, automated cardiac pulse measurements using video imaging and blind source separation." May 7, 2010, Optics Express 18.*

(Continued)

*Primary Examiner* — Jason Heidemann
(74) *Attorney, Agent, or Firm* — Philip E. Blair; Fleit Gibbons Gutman Bongini & Bianco P.L.

(57) ABSTRACT

What is disclosed is a system for compensating for motion induced artifacts in a physiological signal obtained from multiple videos of a first and second region of interest a subject being monitored for a desired physiological function. At least one of the videos being of the first region and at least one of the videos being of the second region. The first region being at least one area of exposed skin where a desired signal corresponding to the physiological function can be registered by a video imaging device. The second region being an area where a movement by the subject is likely to induce motion artifacts into the signal. The videos are processed to isolate pixels associated with the first and second regions. Processed pixels of the isolated first regions to obtain a composite time-series signal. From the composite signal, a physiological signal corresponding to the physiological function is extracted.

32 Claims, 4 Drawing Sheets

(56) References Cited

U.S. PATENT DOCUMENTS

| | | | | |
|---|---|---|---|---|
| 2013/0077823 | A1* | 3/2013 | Mestha | A61B 5/0075 382/103 |
| 2013/0211261 | A1* | 8/2013 | Wang | A61B 5/055 600/476 |
| 2014/0088433 | A1* | 3/2014 | Shan | A61B 5/1128 600/473 |

OTHER PUBLICATIONS

Xia et al., A real-time respiratory motion monitoring system using KINECT: Proof of concept (2012), Medical Physics 39, 2682.*

Liu et al., "Method and Systems for Vascular Pattern Localization Using Temporal Features", U.S. Appl. No. 13/710,794.

Mestha et al., "Removing Environment Factors From Signals Generated From Video Images Captured for Biomedical Measurements", U.S. Appl. No. 13/401,207, filed Feb. 21, 2012.

Xu et al., "Monitoring Respiration With a Thermal Imaging System", U.S. Appl. No. 13/103,406, filed May 9, 2011.

Xu et al., "Subcutaneous Vein Pattern Detection Via Multi-Spectral IR Imaging in an Identity Verification System", U.S. Appl. No. 13/087,850, filed Apr. 15, 2011.

Mestha et al., "Deriving Arterial Pulse Transit Time From a Source Video Image", U.S. Appl. No. 13/401,286, filed Feb. 21, 2012.

Mestha, et al., "Estimating Cardiac Pulse Recovery From Multi-Channel Source Data Via Constrained Source Separation", U.S. Appl. No. 13/247,683, filed Sep. 28, 2011.

Mestha et al., "Systems and Methods for Non-Contact Heart Rate Sensing", U.S. Appl. No. 13/247,575, filed Sep. 28, 2011.

Mestha et al., "Video-Based Estimation of Heart Rate Variability", U.S. Appl. No. 13/532,057, filed Jun. 25, 2012.

Kyal et al., "Continuous Cardiac Signal Generation From a Video of a Subject Being Monitored for Cardiac Function", U.S. Appl. No. 13/871,766, filed Apr. 26, 2013.

Mestha et al., "Processing a Video for Respiration Rate Estimation", U.S. Appl. No. 13/529,648, filed Jun. 21, 2012.

Mestha et al., "Processing a Video for Vascular Pattern Detection and Cardiac Function Analysis", U.S. Appl. No. 13/483,992, filed May 30, 2012.

Bernal et al., "Processing a Video for Tidal Chest Volume Estimation", U.S. Appl. No. 13/486,637, filed Jun. 1, 2012.

Kyal et al., "Continuous Cardiac Pulse Rate Estimation From Multi-Channel Source Video Data With Mid-Point Stitching", U.S. Appl. No. 13/871,728, filed Apr. 26, 2013.

Mestha et al., "Filtering Source Video Data Via Independent Component Selection", U.S. Appl. No. 13/281,975, filed Nov. 8, 2011.

Bernal et al., "Respiratory Function Estimation From a 2D Monocular Video", U.S. Appl. No. 13/680,838, filed Nov. 19, 2012.

Wang et al., "Multi-Band Infrared Camera System Optimized for Skin Detection", U.S. Appl. No. 13/416,436, filed Mar. 9, 2012.

Bernal et al., "Minute Ventilation Estimation Based on Depth Maps", U.S. Appl. No. 13/486,682, filed Jun. 1, 2012.

Bernal et al., "Minute Ventilation Estimation Based on Chest Volume", U.S. Appl. No. 13/486,715, filed Jun. 1, 2012.

Kyal et al., "Continuous Cardiac Pulse Rate Estimation From Multi-Channel Source Video Data", U.S. Appl. No. 13/528,307, filed Jun. 20, 2012.

Mestha et al., "Determining Cardiac Arrhythmia From a Video of a Subject Being Monitored for Cardiac Function", U.S. Appl. No. 13/532,128, filed Jun. 25, 2012.

Tanaka et al., "Processing Source Video for Real-Time Enhancement of a Signal of Interest", U.S. Appl. No. 13/745,283, filed Jan. 18, 2013.

Xu et al., "A Video Acquisition System and Method for Monitoring a Subject for a Desired Physiological Function", U.S. Appl. No. 13/921,939, filed Jun. 19, 2013.

* cited by examiner

FIG. 4

COMPENSATING FOR MOTION INDUCED ARTIFACTS IN A PHYSIOLOGICAL SIGNAL EXTRACTED FROM MULTIPLE VIDEOS

CROSS REFERENCE TO RELATED APPLICATIONS

This patent application is related to concurrently filed and commonly owned U.S. patent application Ser. No. 13/923,588, "Compensating For Motion Induced Artifacts In A Physiological Signal Extracted From A Single Video", by Xu et al., which is incorporated herein in its entirety by reference.

TECHNICAL FIELD

The present invention is directed to systems and methods for compensating for motion induced artifacts in physiological signals obtained from multiple videos captured by multiple video imaging devices of a subject being monitored for a desired physiological function in a non-contact, remote sensing environment.

BACKGROUND

Monitoring of patient cardio-respiratory events is of vital clinical importance in the early detection of potentially fatal conditions. Current technologies that involve contact sensors require that the individual wears such devices constantly. Such a requirement can lead to discomfort, psychological dependence, loss of dignity, and may even cause additional medical issues such as skin infection when sensors have to be worn for an extended period of time. Elderly patients, infants, and those suffering from chronic medical conditions are more likely to suffer from such negative effects of continuous monitoring. The use of an unobtrusive, non-contact, imaging based monitoring of physiological events can go a long way towards alleviating some of these issues.

Previous methods by the authors hereof and other Xerox researchers, have been directed to systems and methods which employ video image devices for monitoring a patient for a desired physiological function in a non-contact, remote sensing environment. In these methods, videos are captured of a region of interest of the resting patient and processed to estimate cardiac and respiratory functions from physiological signals extracted from time-series signals obtained from those videos. Xerox researchers have determined that movement by the resting patient such as a turning of the head, moving an arm, and the like, may impart or induce motion artifacts into the physiological signals extracted from the video of that patient. This is of particular concern when the subject being monitored by video sensing is an infant in a neonatal intensive care unit. Movement of the patient needs to be accounted for in physiological signals extracted from time-series signals obtained from videos.

Accordingly, what is needed in this art is a system and method for compensating for motion induced artifacts in physiological signals obtained from multiple videos captured by multiple video imaging devices of a subject being monitored for a desired physiological function in a non-contact, remote sensing environment.

BRIEF SUMMARY

What is disclosed is a system and method for compensating for motion induced artifacts in physiological signals obtained from multiple videos captured by multiple video imaging devices of a subject being monitored for a desired physiological function in a non-contact, remote sensing environment. The teachings hereof provide a method for accounting for movement by a subject during video acquisition.

In one embodiment of the present method, the following steps are contemporaneously performed in real-time as the streaming videos are received. N videos are received which have been captured by N video imaging devices, which all may be different that are capable of capturing plurality of time-sequential image frames of specified regions of interest of a subject being monitored for the desired physiological functions. The first region(s) of interest define(s) one or more areas of specified regions wherein a desired signal corresponding to the physiological function can be registered by at least one of the video imaging devices in the multiple video capturing system. The second region(s) of interest define(s) an area where movement by the subject is likely to induce motion artifacts into the desired physiological signal wherein a motion signal corresponding to a movement of the subject can be registered by at least one of the video imaging devices in the multiple video capturing system. The first and second regions may be substantially the same region or they may overlap to any extent. The video devices can each have different video capturing capabilities such as number of channels, spatial resolution, spectral resolution, spectral response, frame rate, and structured patterns, For example, an RGB camera is used for capturing a video of the subject facial region for heart rate, while another video camera can capture a video of the body using structured patterns, As the videos are received, the videos are processed to isolate pixels in the image frames that are associated with each of the first and second regions of interest such that the first and second regions can be isolated in their respective image frames. Pixels associated with the isolated first region(s) are processed to obtain respective time-series signals which, in turn, are combined to generate a composite time-series signal. A physiological signal corresponding to the desired physiological function is extracted from the composite time-series signal. Pixels of the isolated second region(s) are analyzed to identify one or more time intervals when a movement by the subject has occurred. As the time intervals are identified or alternatively in a batch processing mode, the physiological signal is processed over the identified time interval(s) to obtain a processed physiological signal. The processed physiological signal can be communicated to a display device or further analyzed to obtain cardiac and/or respiratory signals for continuous monitoring of the resting subject. In one embodiment, an alert is initiated if the monitored cardiac/respiratory signals provide an indication that a cardiac/respiratory event might have occurred.

Many features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

What is disclosed is a system and method for compensating for motion induced artifacts in physiological signals obtained from multiple videos captured by multiple video imaging devices of a subject being monitored for a desired physiological function in a non-contact, remote sensing environment.

NON-LIMITING DEFINITIONS

Figure 1:
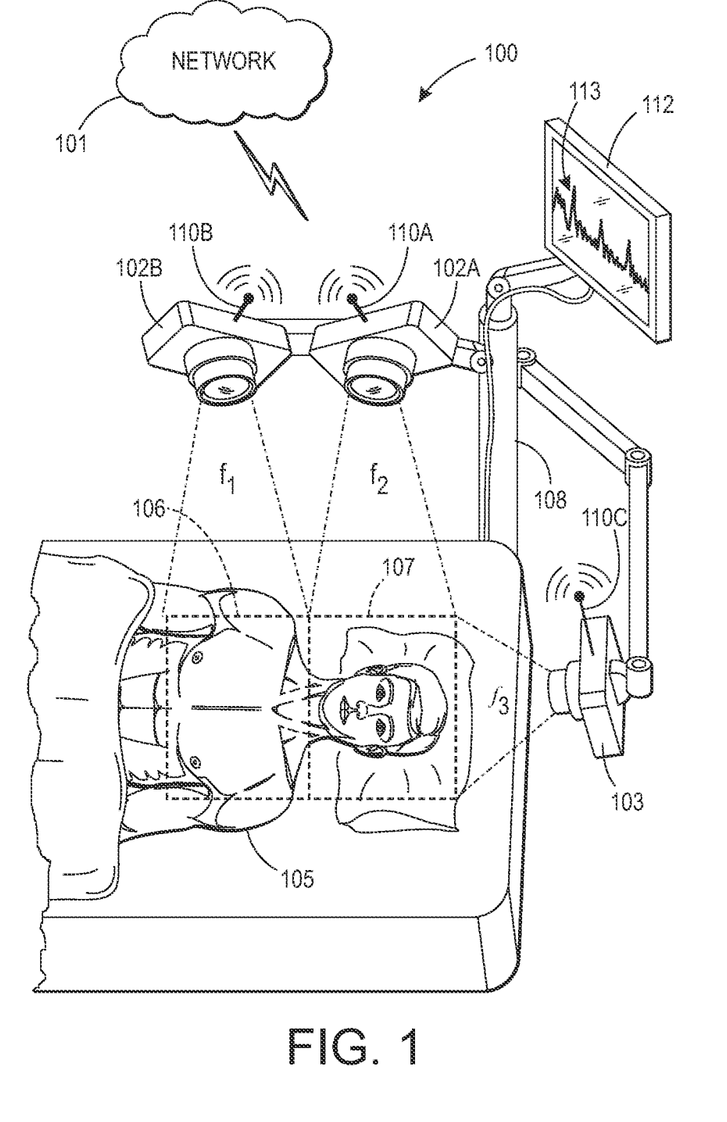
FIG. 1 illustrates an example system for capturing N videos of a subject of interest being monitored for a desired physiological signal in a non-contact, remote sensing environment as disclosed herein.

A "subject of interest" refers to a human having a physiological function. Although the term "human" or "patient" may be used throughout this text, it should be appreciated that the subject may be something other than a human such as, for instance, an animal. Use of "human", "person" or "patient" is not to be viewed as limiting the scope of the appended claims strictly to human beings. FIG. 1 shows an example system, as disclosed herein, for monitoring a resting subject of interest 105 for a desired physiological signal in a non-contact, remote sensing environment.

A "video", as is generally understood, is to a time-varying sequence of image frames captured of one or more regions of interest of a subject. The video may also contain other components such as, audio, time reference signals, frame rate, and the like. The video is captured by a video imaging device.

A "video imaging device" refers to a single-channel or multi-channel video camera for acquiring a video. Video devices include: RGB cameras, 3D video imaging devices, infrared video imaging devices, multi-spectral video systems, hyperspectral video systems, and hybrid devices comprising any combination hereof. FIG. 1 shows example video imaging devices 102A-B and 103 capturing video of first and second regions of interest 106 and 107, respectively. A video imaging device may have a plurality of outputs from which the video can be retrieved or otherwise received on a per-channel basis and may incorporate one or more memory, storage devices, and processors for executing machine readable program instructions for processing and analyzing video in accordance with the teachings hereof. Video captured by a video imaging device is processed to isolate a first and second region of interest.

A "first region of interest" refers to one or more areas of exposed skin of the subject of interest from which a desired signal corresponding to a desired physiological function can be registered by a video imaging device. One video device for skin detection is disclosed in: "Multi-Band Infrared Camera System Optimized For Skin Detection", U.S. Pat. No. 9,171,196, by Wang et al., which is incorporated herein in its entirety by reference.

A "second region of interest" refers to an area of a subject where movement by that subject is likely to induce motion artifacts into the physiological signal desired to be obtained such that a desired physiological function can be monitored. The first and second regions of interest may be the same region or area of the subject's body or may overlap one another. For example, a first region of interest may be the subject's chest while the second region of interest is the subject's head or facial area, as shown in FIG. 1. The first region may be an area of the subject's upper arm while the second region is an area of the lower arm, shoulder, or neck. The first and second regions of interest may be the same region or area of the subject's body, or the areas may overlap to some extent. In FIG. 1, assume patient 105 is being monitored for a cardiac function, i.e., the desired physiological function is a cardiac function and the target physiological signal is a cardiac signal. In this scenario, video imaging devices 102A-B are capturing video of a first region of interest 106 in each camera's respective field of view $f_1$ and $f_2$, and video imaging device 103 is capturing video of a second region of interest 107 in that camera's field of view $f_3$. The first region of interest is an area of the subject's chest where a cardiac signal can be registered by the video imaging device and the second region of interest is an area where a movement is likely to induce motion artifacts into the desired cardiac signal, i.e., a movement of the head area is likely to induce a movement in the chest area and a change in the cardiac function.

"Isolating a region of interest" can be effectuated in a variety of ways using any of a wide array of imaging processing techniques that are well established in the image processing arts. Such regions can be identified in image frames of a video using, for example, a pixel classification method. Methods for classifying pixels in an image are disclosed in: "Determining A Total Number Of People In An IR Image Obtained Via An IR Imaging System", U.S. Pat. No. 8,520,074, by Wang et al., which discloses a ratio method for classifying pixels in an image; "Determining A Number Of Objects In An IR Image", U.S. Pat. No. 8,587,657, by Wang et al., which discloses a correlation method and a best fitting reflectance method for classifying pixels in an image; and "Determining A Pixel Classification Threshold For Vehicle Occupancy Detection", U.S. Pat. No. 9,202,118, by Wang et al., which discloses a method for determining a threshold used for pixel classification, all of which are incorporated herein in their entirety by reference. Pixels associated with regions of interest can be identified in image frames using, for example, object identification, pattern recognition, and facial recognition methods. During system setup and configuration, a technician may use a mouse or a touchscreen display to manually draw a rubber-band box around one or more areas of the displayed video thereby defining the first and/or second regions with a boundary thereof being stored and used during processing to isolate these regions.

"Identifying time intervals" means to analyze the isolated second regions of video to find time intervals where movement occurred. A time interval of movement in the isolated second region can be identified using a variety of techniques. For example, movement can be determined by an amount of change detected in center pixel locations associated with the isolated second region relative to a fixed object in the environment or fixed position. A time interval can be identified by a change in a shape of the isolated second region, i.e., the subject's head turned or lifted off the pillow. A software tool such as a facial recognition software or an object tracking software which is continuously processing the isolated second regions for movement may send a signal or otherwise provide a feedback when a movement is detected. This signal would include a start/stop of each of the time intervals where movement was detected. It should be appreciated that threshold levels (min/max) for movement may be preset by a user or technician and, based upon the amount of detected movement relative to those threshold levels, the time interval associated with this movement can be deemed to be significant enough to be processed accordingly or insignificant so as to be ignored.

"Processing a physiological signal" means to compensate for the movement over the identified time intervals where that movement occurred. This can be performing by filtering segments of the physiological signal over the given time interval using, for example, a smoothing technique such as band-pass filtering. Compensating for the movement at an identified time interval may mean discarding segments of the physiological signal over that time interval in those instances where it has been determined that the movement at this time interval is at or above a maximum threshold level or the second region has moved to overlap with the first region, where the physiological signal can no longer be extracted. Conversely, segments of the physiological signal may be left intact or "as-is" in those instances where it has been determined that a movement over this time interval is at or below a minimum threshold level. Segments of the physiological signal at a given time interval may be replaced, in whole or in part, with a default segment that has been defined by a user or has been pre-selected by a technician from an array of optional default signal segments.

A "time-series signal" is a signal of interest extracted from a video which contains meaningful data that relates to the desired physiological function that the subject of interest is being monitored for. A time series signal can be generated from video using a variety of techniques such as, for example, by averaging pixel values within an isolated region of interest across a pre-defined number of image frames. A sliding window may be used to define individual signal segments so that segments can be weighted. Such a weighting may be applied over one or more signal segments while other signal segments are not weighted. Methods for weighting signal segments are widely used in the signal processing arts. In one embodiment, the signal segments are weighted by a factor f, where $0 < f \leq 1$, is associated with the amount of subject movement detected. One system and method for using a factor is disclosed in: "A Video Acquisition System And Method For Monitoring A Subject For A Desired Physiological Function", U.S. patent application Ser. No. 13/921,939, by Xu et al., which is incorporated herein in its entirety by reference. It should be appreciated that the time-series signal may be received or retrieved from a remote device such as a computer workstation over a wired or wireless network with the captured video having been communicated directly to the remote device for generation of the time-series signal on a continuous basis.

"Stitching" ' refers to a method of connecting signal segments to obtain a continuous signal. Signal segments may be stitched together using a mid-point or an end-point stitching technique as disclosed in: "Continuous Cardiac Pulse Rate Estimation From Multi-Channel Source Video Data With Mid-Point Stitching", U.S. Pat. No. 9,036,877, by Kyal et al., "Continuous Cardiac Pulse Rate Estimation From Multi-Channel Source Video Data", U.S. Pat. No. 8,855,384, by Kyal et al. and "Continuous Cardiac Signal Generation From A Video Of A Subject Being Monitored For Cardiac Function", U.S. patent application Ser. No. 13/871,766, by Kyal et al., which are incorporated herein in their entirety by reference. The overlapping signal segments can be adjusted based on the amount of subject movement detection.

Physiological Signals

A "physiological signal" refers to a signal extracted from a time-series signal generated from a video of a region of interest.

A "physiological function" refers to a respiratory function or a cardiac function. If the desired physiological function for which the subject is being monitored is a respiratory function then the physiological signal is a respiratory signal. This respiratory signal is analyzed for any of: pulmonary volume, minute ventilation, and respiration rate. The physiological event which the respiratory patient would be monitored for would be the occurrence of Sudden Infant Death Syndrome, Infant Respiratory Distress Syndrome, Respiratory Failure, and/or Pulmonary Disease. If the desired physiological function for which the subject is being monitored is a cardiac function then the physiological signal is a cardiac signal. The cardiac signal is analyzed for any of: heart rate variability, cardiac pulse frequency, and pulse transit time. In this case, the physiological event for which the cardiac patient would be monitored for would be, for example, the occurrence of any of: Cardiac Arrhythmia, Cardiac Stress, Cardiac Failure, and Heart Disease.

Respiratory Function

A "respiratory function" refers to a function of the lungs. Respiratory functions include: pulmonary volume, minute ventilation, and respiration rate. Regarding pulmonary volumes, TABLE 1 provides average volumes (in liters) for healthy adult human males and females.

TABLE 1

| Volume | Average (in liters) | | Derivation |
| --- | --- | --- | --- |
| | In men | In women | |
| Tidal Volume (TV) | 0.5 | 0.5 | |
| Expiratory Reserve Volume (ERV) | 1.0 | 0.7 | |
| Residual Volume (RV) | 1.2 | 1.1 | |
| Inspiratory Reserve Volume (IRV) | 3.3 | 1.9 | |
| Vital Capacity (VC) | 4.6 | 3.1 | IRV + TV + ERV |
| Inspiratory Capacity (IC) | 3.8 | 2.4 | IRV + TV |
| Functional Residual Capacity (FRC) | 2.2 | 1.8 | ERV + RV |
| Total Lung Capacity (TLC) | 6.0 | 4.2 | IRV + TV + ERV + RV |

Expiratory Reserve Volume (ERV) is the maximal volume of air that can be exhaled from the end-expiratory position. Residual Volume (RV) is the volume of air remaining in the lungs after maximal exhalation (residual air remains in the lungs no matter how hard one tries to expel all their air). Inspiratory Reserve Volume (IRV) is the maximal volume of air that can be inhaled at the end-inspiratory level. Vital Capacity (VC) is the maximum amount of air a person can expel from the lungs after maximum inhalation. Inspiratory Capacity (IC) is the volume of air that can be inhaled after normal inspiration. Functional residual capacity (FRC) is the volume in the lungs at the end-expiratory position. Total Lung Capacity (TLC) is the total volume of air in the lungs at maximal inflation.

"Respiration rate" is often measured when a subject is at rest and simply involves counting the number of breaths taken in a minute. A resting adult human takes about 12-20 breaths per minute depending on the overall condition of the cardio-vascular and respiratory systems. Restrictive pulmonary diseases such as pulmonary fibrosis, pneumothorax, Infant Respiratory Distress Syndrome, and the like, decrease lung volume, whereas obstructive pulmonary diseases such as, for instance, asthma, bronchitis, and emphysema, obstruct airflow.

"Chest volume" is the volume of air displaced by inspiration and expiration. Tidal breathing refers to normal breathing as opposed to heavy breathing due to exercise, for example. Thus, tidal chest volume or simply tidal volume (TV) is the volume of air drawn into the lungs during tidal breathing. In a healthy, young adult, tidal chest volume is about 0.5 Liters of air. Since total lung capacity of an average adult human is approximately 6.0 liters of air, the lungs displace a relatively small volume after inspiration and expiration while tidal breathing. Restrictive pulmonary diseases such as pulmonary fibrosis, pneumothorax, and Infant Respiratory Distress Syndrome, decrease lung volume, whereas obstructive pulmonary diseases such asthma, bronchitis, and emphysema, obstruct airflow.

Methods for extracting a respiratory signal from a time-series signal obtained from a video of a region of interest of a subject being monitored in a non-contact, remote sensing environment, are disclosed in the following references which are incorporated herein in their entirety by reference. "Respiratory Function Estimation From A 2D Monocular Video", U.S. Pat. No. 8,792,969, by Bernal et al. "Monitoring Respiration with a Thermal Imaging System", U.S. Pat. No. 8,790,269, by Xu et al. "Processing A Video For Tidal Chest Volume Estimation", U.S. Pat. No. 9,226,691, by Bernal et al. "Minute Ventilation Estimation Based On Depth Maps", U.S. Pat. No. 8,971,985, by Bernal et al. "Minute Ventilation Estimation Based On Chest Volume", U.S. patent application Ser. No. 13/486,715, by Bernal et al. "Processing A Video For Respiration Rate Estimation", U.S. patent application Ser. No. 13/529,648, by Bernal et al.

Cardiac Function

"Cardiac function" refers to the function of the heart and, to a large extent, to the cardio-vascular system. In most species, the heart comprises muscle which repeatedly contracts to pump blood throughout the vascular network. This pumping action generates a pressure wave which generally comprises a forward wave generated by contraction and a reflected wave returning from the periphery. This wave pressing on the walls of the subject's blood vessels as the heart beats correlates to the subject's blood pressure.

"Cardiac pulse frequency" is the frequency of the pulse pressure wave generally given in beats per minute (bpm). An adult human's cardiac pulse frequency is around 72 bpm. Each species has their own normal pulse frequency range. A resting adult human has a cardiac pulse rate of about 72 bpm. The frequency range of the human cardiac pulse is between about 50 bpm to 240 bpm. Each species have their own "normal" heart rate and thus their own cardiac pulse frequency range. Heart rate is proportional to the cardiac output, i.e., the volume of blood the heart can pump expressed in L/min (~5 L/min in an adult human). Cardio Output is often defined as: CO=SV·HR, where SV is stroke volume and HR is heart rate (in bpm). Stroke volume can be affected by valvular dysfunction and ventricular geometric form.

"Cardiac output" refers to the volume of blood the heart muscle can pump and is generally expressed in L/min. In an adult human, the cardiac output is approximately 5 L/min. Cardio output is given by: CO=SV·HR, where SV is stroke volume, and HR is heart rate in bpm. Stroke volume can be affected by valvular dysfunction and ventricular geometric form.

"Pulse transit time" refers to the time it takes the pulse pressure wave to travel from a proximal location (upstream) to a distal location (downstream) in the subject's vascular network. Pulse transit time (PTT) is a function of wave velocity which, in turn, is a function of blood pressure, vessel diameter, and blood density. Localized PTT is used as an indirect marker of various pathologic conditions such as, for example, vessel blockage between two points and peripheral neuropathy.

"Heart Rate Variability" (HRV) is where the time interval between heart beats varies. Variation in the beat-to-beat interval is a physiological phenomenon. The SA node receives several different inputs and the instantaneous variation in RR interval (RR interval is the time interval between two consecutive/successive R waves from the ECG) and its variation are the results of these inputs. The main inputs are the sympathetic nervous system (SNS) and the parasympathetic nervous system (PSNS) and humoral factors. Respiration gives rise to waves in heart rate mediated primarily via the PSNS. Factors that affect the input include the baroreflex, thermoregulation, hormones, sleep-wake cycle, meals, physical activity, and stress. Decreased PSNS activity or increased SNS activity will result in reduced HRV. HRV is also known by other terms including: Heart Period Variability, Cycle Length Variability, and RR Variability where R is a point corresponding to the peak of the QRS complex of the ECG wave and RR is the interval between successive R-waves. Spectral analysis of R-waves, i.e., RR interval of a 2 to 5 minute short ECG recording, contains the following components: (1) a very low frequency (VLF) component at a frequency range that is 0.04 Hz; (2) a low frequency (LF) component that is within 0.04 to 0.15 Hz; and (3) a high frequency (HF) component that is within 0.15 to 0.40 Hz. There is also an ultra-low frequency component (ULF) which is associated with day and night differences at frequencies<0.003 Hz which are typically observed when the signals have been captured over a period of 18 hours or longer. The physiological explanation of the VLF component is less defined and hence it is not considered in a HRV analysis.

"Cardiac arrhythmia", also known as cardiac dysrhythmia, means an irregular heartbeat caused by a change in the heart's electrical conduction system.

"Atrial fibrillation" (AF or A-fib), is one of the most common cardiac arrhythmias. In AF, the normal regular electrical impulses generated by the sinoatrial node are overwhelmed by disorganized electrical impulses usually originating in the roots of the pulmonary veins, leading to irregular conduction of impulses to the ventricles which generate the heartbeat. In atrial fibrillation, the P waves, which represent depolarization of the atria, are absent, with unorganized electrical activity in their place, and irregular RR intervals due to irregular conduction of impulses to the ventricles. Irregular RR intervals may be difficult to determine if the rate is extremely rapid. AF increases the risk of stroke; the degree of stroke risk can be up to seven times that of the average population, depending on the presence of additional risk factors such as high blood pressure. It may be identified clinically when taking a pulse measurement. The presence of AF can be confirmed with an ECG (or EKG) which demonstrates the absence of P-waves together with an irregular RR intervals. AF may occur in episodes lasting from minutes to days ("paroxysmal"), or be permanent in nature. A number of medical conditions increase the risk of AF, particularly narrowing of the mitral valve of the heart ("mitral stenosis"). Atrial fibrillation may be treated with medications to either slow the heart rate to a normal range ("rate control") or revert the heart rhythm back to normal ("rhythm control"). The evaluation of atrial fibrillation involves diagnosis, determination of the etiology of the arrhythmia, and classification of the arrhythmia.

Methods for extracting a cardiac signal from a time-series signal obtained from a video of a region of interest of a subject being monitored in a non-contact, remote sensing environment, are disclosed in the following references which are incorporated herein in their entirety by reference. "Deriving Arterial Pulse Transit Time From A Source Video Image", U.S. Pat. No. 8,838,209, by Mestha. "Estimating Cardiac Pulse Recovery From Multi-Channel Source Data Via Constrained Source Separation", U.S. Pat. No. 8,617,081, by Mestha et al. "Video-Based Estimation Of Heart Rate Variability", U.S. Pat. No. 8,977,347, by Mestha et al. "Systems And Methods For Non-Contact Heart Rate Sensing", U.S. Pat. No. 9,020,185, by Mestha et al. "Processing A Video For Vascular Pattern Detection And Cardiac Function Analysis", U.S. Pat. No. 8,897,522, by Mestha et al. "Subcutaneous Vein Pattern Detection Via Multi-Spectral IR Imaging In An Identity Verification System", U.S. Pat. No. 8,509,495, by Xu et al. "Method And Systems For Vascular Pattern Localization Using Temporal Features", U.S. Pat. No. 8,977,004, by Liu et al. "Determining Cardiac Arrhythmia From A Video Of A Subject Being Monitored For Cardiac Function", U.S. Pat. No. 8,768,438, by Mestha et al. Signal Enhancement Signals obtained by having processed the video may be further processed using the methods disclosed in any of: "Processing Source Video For Real-Time Enhancement Of A Signal Of Interest", U.S. Pat. No. 8,879,867, by Tanaka et al. "Removing Environment Factors From Signals Generated From Video Images Captured For Biomedical Measurements", U.S. Pat. No. 9,185,353, by Mestha et al. "Filtering Source Video Data Via Independent Component Selection", U.S. Pat. No. 8,600,213, by Mestha et al., all of which are incorporated herein in their entirety by reference.
Example Video Capture System Reference is now being made to FIG. 1 which illustrates an example system 100 for capturing multiple videos of a subject of interest being monitored for a desired physiological signal in a non-contact, remote sensing environment.

In FIG. 1, a subject of interest 105 lies in a bed where video imaging devices 102A-B and 103 are actively acquiring video of the first and second regions of interest. The subject is shown resting his head on a pillow while a lower portion of his body is covered by a sheet. Although the subject is shown in a prone position, it should be appreciated that video of the regions of interest can be captured while the subject is positioned in other supporting devices such as, for example, a chair or wheelchair, standing up, including walking or moving.

Video imaging devices 102A-B are rotatably mounted on a robotic arm 108 so each camera's respective field of view $f_1$ can be directed or re-directed to capture video of the first region of interest. Video imaging device 103 is also rotatably mounted on support arm 108 so that camera's field of view $f_2$ can be directed or re-directed to capture video of the second region of interest. The illustrated video imaging devices capture time-sequential image frames of the subject using sensors which may be a single sensor or a sensor array including a plurality of individual or separate sensor units. A processor integral to the video imaging devices 102A-B receives video, processes the image frames in a manner as disclosed herein in real-time, and communicates signal(s) to display device 112 via respective antennae 110A-C or to one or more remote devices over network 101. Each of the video imaging devices may include wireless and wired elements and may be connected via other means such as coaxial cable, radio frequency, Bluetooth, or any other manner for communicating data.

Monitor 112 is rotatably mounted to the support arm so the monitor can be turned as needed so others in the room can view video or signals 113 displayed thereon. The support arm is on wheels (not shown) so that the video imaging system can be moved from bed to bed and room to room throughout the facility. In various embodiments hereof, the subject's cardiac/respiratory signals are continuously displayed and monitored for the occurrence of a physiological event, and an alarm or notification initiated to a nurse, doctor, or technician in the event that the physiological function of the patient falls outside a set of pre-defined parameters.

Network 101 facilitates communication with remote devices such as, for instance, a workstation or a handheld device such as an Smartphone, iPhone, iPad, notebook, and the like. Data is transferred in the form of signals which may be, for example, electronic, electromagnetic, optical, light, or other signals. These signals are provided to a communications device such as a server which transmits and receives data packets by means of a wire, cable, fiber optic, phone line, cellular link, RF, satellite, or other medium or communications pathway. Techniques for placing devices in networked communication are well established. Therefore, a further discussion as to specific techniques for networking devices has been omitted. Any of the networked devices may include a network interface card or system.
Flow Diagram of One Embodiment Reference is now being made to the flow diagram of FIG. 2 which illustrates one embodiment of the present method for compensating for motion induced artifacts in physiological signals obtained from multiple videos captured by multiple video imaging devices of a subject being monitored for a desired physiological function in a non-contact, remote sensing environment. Flow processing begins at step 200 and immediately proceeds to step 202.

Figure 2:
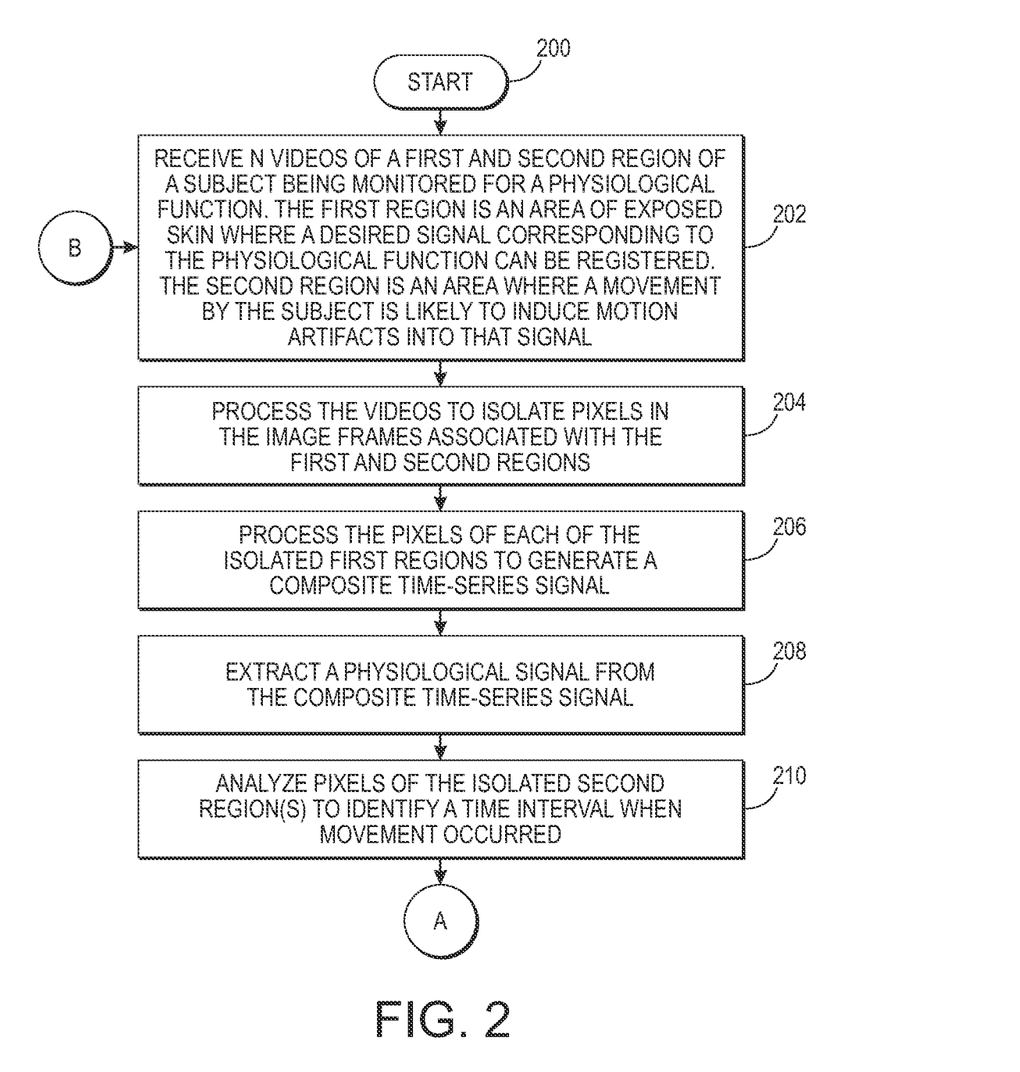
FIG. 2 illustrates one embodiment of the present method for compensating for motion induced artifacts in physiological signals obtained from multiple videos captured by multiple video imaging devices of a subject being monitored for a desired physiological function in accordance with the teachings hereof.

At step 202, receive N videos captured of a first and second region of interest of a subject being monitored for a desired physiological function. The videos are captured by each of N video imaging device. The video comprises a plurality of time-sequential image frames. The first region is an area of exposed skin wherein a desired signal corresponding to the physiological function can be registered. The second region is an area where a movement by the subject is likely to induce motion artifacts into the signal.

At step 204, process the videos to isolate pixels in the image frames associated with the first and second regions of interest.

At step 206, process pixels of each of the isolated first regions to generate a composite time-series signal.

At step 208, extract a physiological signal from the composite time-series signal. The extracted physiological signal corresponds to the desired physiological function for which this subject is being monitored.

At step 210, analyze pixels of each of the isolated second region(s) to identify a time interval when movement occurred.

Figure 3:
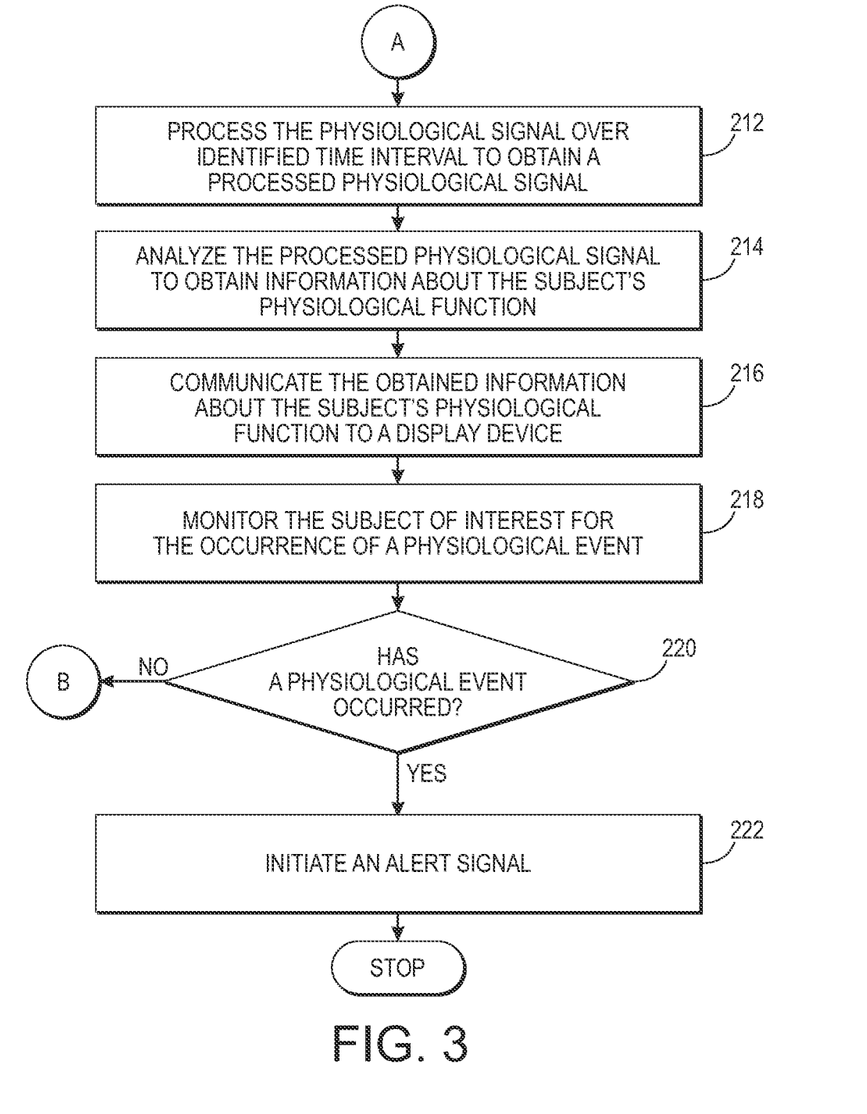
FIG. 3 is a continuation of the flow diagram of FIG. 2 with flow processing continuing with respect to node A.

Reference is now being made to FIG. 3 which is a continuation of the flow diagram of FIG. 2 with flow processing continuing with respect to node A.

At step 212, process the physiological signal over the time interval (identified in step 210) to obtain a processed physiological signal.

At step 214, analyze the processed physiological signal to obtain information about the desired physiological function.

If the desired physiological function is a cardiac function then the processed physiological signal is a cardiac signal. The cardiac signal can be analyzed to determine information about the subject's cardiac function such as, for example, heart rate variability, cardiac pulse frequency, and pulse transit time. If the desired physiological function is a respiratory function then the processed physiological signal is a respiratory signal. The respiratory signal can be analyzed to determine information about the subject's respiratory function such as, for example, pulmonary volume, minute ventilation, and respiration rate. The information may take the form of a signal, chart, graph, video, text, and the like.

At step 216, communicate the obtained physiological information to a display device. The processed physiological signal may be communicated to a storage device for storage and subsequent retrieval or communicated to a remote device over a network.

At step 218, monitor the subject of interest for the occurrence of a physiological event using the physiological information (of step 214). If the physiological function is a cardiac function and the physiological signal is a cardiac signal, the subject would be monitored for an occurrence of any of: Cardiac Arrhythmia, Cardiac Stress, Cardiac Failure, and Heart Disease. On the other hand, if the physiological function is a respiratory function and the physiological signal is a respiratory signal then the subject would be monitored for an occurrence of any of: Sudden Infant Death Syndrome, Respiratory Distress, Respiratory Failure, and Pulmonary Disease.

At step 220, a determination is made, as a result of the monitoring of step 218, whether a physiological event which the subject is being monitored for, has occurred. If so then processing continues with respect to step 222.

At step 222, initiate an alert signal. The alert signal or notification can be sent to a technician, nurse, medical practitioner, and the like. In one embodiment, the alert signal is communicated via network 101 of FIG. 1. Such a signal may take the form of a message or, for instance, a bell tone or a sonic alert being activated at a nurse's station. The alert signal may take the form of initiating a visible light which provides an indication such as, for instance, a blinking colored light. The alert can be a text, audio, and/or video message. Such embodiments are intended to be encompassed within the scope of the appended claims. In this embodiment processing continues with respect to node B. In other embodiments, additional actions may be taken as needed or desired. If, as a result of the monitoring at step 218, no physiological event has occurred at step 220, then processing repeats with respect to node B.

It should be appreciated that the teachings hereof are intended to be used in a continuous manner for patient monitoring. As disclosed and claimed herein, the first and second regions are continuously isolated in the image frames of the video as it is captured in real-time. The isolated first regions are continuously processed to obtain a time-series signal and a physiological signal is being continuously extracted, in real-time, from the time-series signal. Concurrently, the isolated second region(s) are continuously analyzed for movement. In response to a movement having been detected in the isolated second region, the time interval of that movement is identified and a corresponding time interval of the extracted physiological signal is being processed in accordance herewith to reduce or otherwise compensate for the detected movement. As previously discussed, a minimum and a maximum threshold for movement may be pre-set and, based upon the degree of that movement, the physiological signal is processed accordingly for that time interval.

The flow diagrams depicted herein are illustrative. One or more of the operations illustrated in the flow diagrams may be performed in a differing order. Other operations may be added, modified, enhanced, or consolidated. Variations thereof are intended to fall within the scope of the appended claims.

Block Diagram of Video Processing System

Figure 4:
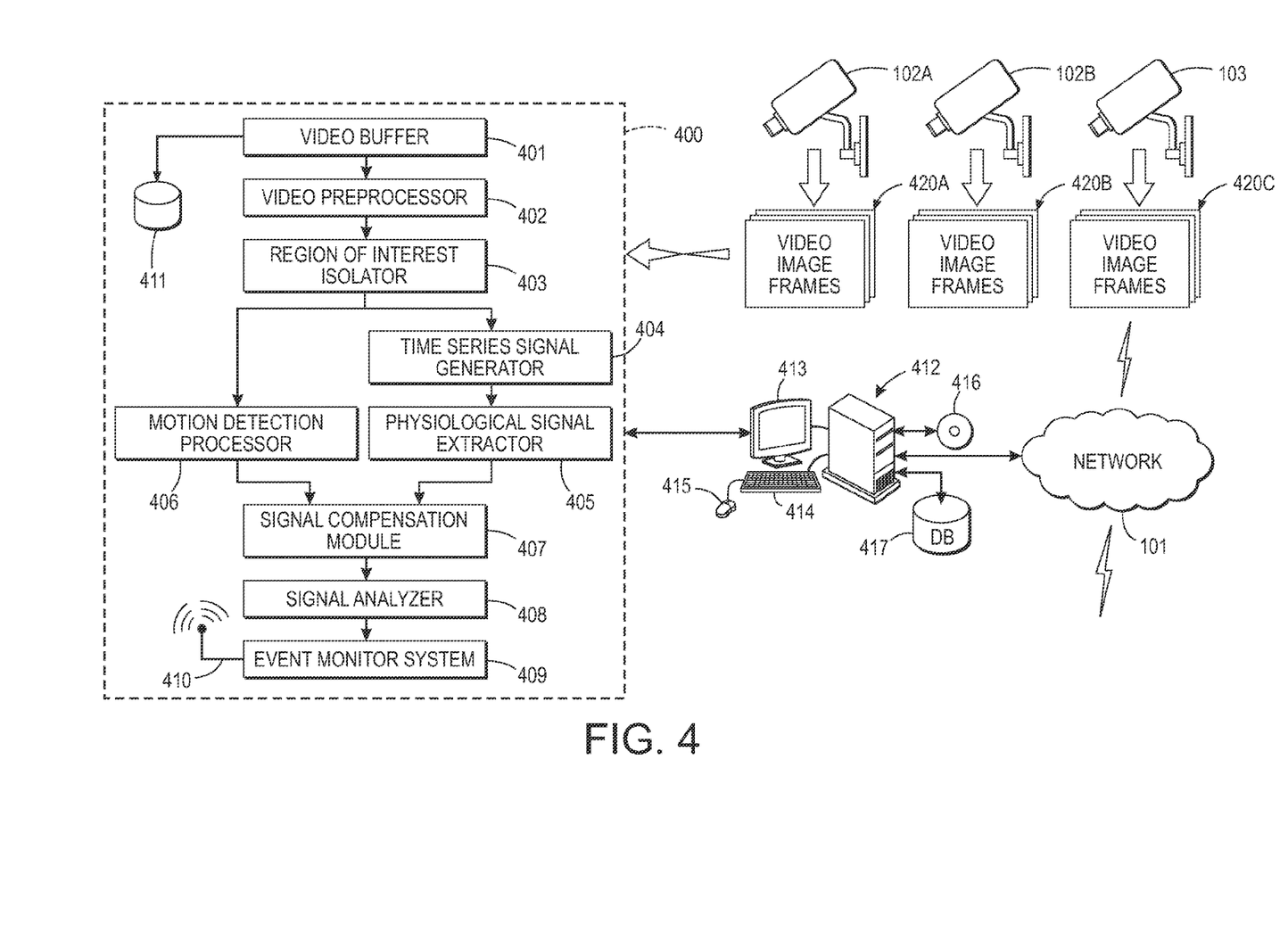
FIG. 4 is a block diagram of one example video processing system for processing a video in accordance with the embodiment described with respect to the flow diagrams of FIGS. 2 and 3.

Reference is now being made to FIG. 4 which shows a block diagram of one example video processing system 400 for processing a video in accordance with the embodiment shown and described with respect to the flow diagrams of FIGS. 2-3.

Video imaging devices 102A and 102B capture video of a first region of interest of a subject of interest being monitored for a desired physiological function. Video imaging device 103 captures video of a second region of interest in a manner as shown and described with respect to FIG. 1. Each of the videos comprises a plurality of time-sequential image frames, at 420A-C respectively, which are received into Buffer 401. The time-sequential image frames are communicated to Storage Device 411 which can be, for instance, a hard drive, RAM, ROM, or a device with a removable media such as a DVD or CDROM drive.

The video is provided to Video Pre-Processor 402 for pre-processing, as needed, for those video processing systems where it is desirable to first process the received video in advance of further processing in accordance herewith. Received video may be pre-processed, for example, to enhance contrast utilizing known contrast enhancement techniques such as histogram equalization or contrast adjustment. Image frames can be skew and rotation corrected if needed. Gaps detected between video image frames in each of the x and y directions can be corrected as desired. Various images can be boundary corrected and cropped and frame registration performed. Images can be pre-processed for relative shift due to the location of each filter band within the filter and camera-to-object distance can also be corrected, if needed. Intensity values associated with pixels of images can be re-scaled based on a sensor response of each wavelength band of the video imaging systems.

Region of Interest Isolator 403 processes, in real-time, image frames of the videos to identify and isolate the first and second regions of interest contained therein, respectively. Example first and second regions of interest are shown at 106 and 107 of FIG. 1. In one embodiment, the pre-processed image frames are communicated to workstation 412 and displayed, for example, on display 413 such that a region of interest can be selected. An operator of the workstation can make a selection thereof using keyboard 414 and mouse 415 by, for instance, manipulating a rubberband box to define areas or regions of interest for processing.

Time-Series Extractor 404 receives the isolated first region(s) and generates a time-series signal associated with each of these isolated regions. Extractor 404 is further configured to generate a composite time-series signal from each of the time-series signals obtained from each of the isolated first regions of interest. Physiological Signal Extractor 405 receives the composite time-series signal and extracts a physiological signal corresponding to the desired physiological function for which the subject is being monitored. Contemporaneously, Motion Detection Processor 406 receives the isolated second region(s) from Region of Interest Isolator 403 and, by processing pixels of those isolated second regions, proceeds to identify time intervals where a movement by the subject has occurred. Signal Compensation Module 407 receives the identified time intervals and processes the physiological signal over the identified time interval(s) to obtain a processed physiological signal. Signal Analyzer 408 receives the processed physiological signal as a streaming signal, and analyzes that signal to obtain a cardiac and/or a respiratory signal, depending on the nature of the physiological function for which the subject is being monitored. Event Monitor Sub-System 409 continuously monitors the streaming cardiac/respiratory signal and, determines whether a physiological event has occurred. If so, an alert or notification is initiated using, for example, transmissive element 410. The alert signal may include images, video, and/or aspects of a processing such as results, interim values, and the like.

The workstation 412 is shown comprising a computer case housing a motherboard, CPU, memory, interface, storage device, and a communications link such as a network card. The workstation is also shown having a display device 413 such as a CRT, LCD, or touchscreen display. An alphanumeric keyboard 414 and a mouse 415 effectuate a user input. It should be appreciated that the workstation has an operating system and other specialized software configured to display a variety of numeric values, text, scroll bars, pull-down menus with user selectable options, and the like, for entering, selecting, or modifying information. The workstation has a removable media 416 and implements an external database 417 wherein various records are stored. Although the database is shown as an external device, the database may be internal to computer case mounted on a hard disk housed therein. Records stored in the database can be indexed, searched, and retrieved in response to a query. Patient information can be stored to any of the records in the database and used for physiological event monitoring. Any of the modules and processing units of FIG. 4 are in communication with the workstation via pathways (not shown) and may further be in communication with one or more remote devices over network 101 including any of the video imaging devices 102A-B and 103. It should be appreciated that some or all of the functionality performed by any of the modules of the processing system 400 may be performed, in whole or in part, by components internal to the workstation.

Various modules may designate one or more components which may, in turn, comprise software and/or hardware designed to perform the intended function. A plurality of modules may collectively perform a single function. Each module may have a specialized processor for executing machine readable program instructions which facilitate performance of the intended function. A module may comprise hardware such as an ASIC, electronic circuit, or special purpose processor. A plurality of modules may be executed by either a special purpose computer system or a plurality of computer systems in parallel. Connections between modules include both physical and logical connections. Modules may further comprise an operating system, drivers, device controllers, and other apparatuses some or all of which may be connected via a network. One or more aspects of the present method may be implemented in conjunction with a smartphone. Various aspects of the teachings hereof may be practiced in distributed computing environments where tasks are performed by a plurality of remote devices linked via a network. The teachings hereof may be partially or fully implemented in software using source code that can be used on a variety of computer platforms. One or more of the capabilities hereof can be emulated in a virtual environment or leverage off-the-shelf software. The teachings hereof can be implemented using any known or later developed systems, structures, devices, or software by those skilled in the applicable art without undue experimentation from the description provided herein.

One or more aspects of the systems and methods described herein are intended to be incorporated in an article of manufacture. The article of manufacture may be shipped, sold, leased, or otherwise provided separately either alone or as part of an add-on, update, upgrade, or product suite. Various of the above-disclosed features and functions, or alternatives thereof, may be combined into other systems or applications. Presently unforeseen or unanticipated alternatives, modifications, variations, or improvements may become apparent and/or subsequently made by those skilled in the art which are also intended to be encompassed by the following claims. It will be appreciated that the above-disclosed and other features and functions, or alternatives thereof, may be desirably combined into many other different systems or applications. Changes to the above-described embodiments may be made without departing from the spirit and scope of the invention. The teachings of any printed publications including patents and patent applications, are each separately hereby incorporated by reference in their entirety.

What is claimed is:

1. A method for compensating for motion induced artifacts in physiological signals obtained from multiple videos captured by multiple video imaging devices of a subject being monitored for a desired physiological function in a non-contact, remote sensing environment, the method comprising:

receiving N videos, where N≥2, of a subject being monitored for a desired physiological function, each video comprising a plurality of time-sequential image frames acquired concurrently by N video devices, at least one of said videos being of a first region and at least one of said videos being of a second region, said first region being at least one area of exposed skin where a desired signal corresponding to said physiological function can be registered by a video imaging device, said second region being an area where a movement by said subject is likely to induce motion artifacts into said signal;

processing said videos to isolate pixels in said image frames associated with each of said first and second regions of interest;

processing pixels of each of said isolated first regions to obtain a composite time-series signal;

extracting, from said composite time-series signal, a physiological signal corresponding to said desired physiological function;

analyzing pixels of each of said isolated second regions to identify time intervals when movement by said subject occurred; and for each of said identified time intervals when movement has occurred:

determining an amount of movement over the current interval; and in response to said movement being above a maximum threshold, discarding a segment of said physiological signal corresponding to said current interval, otherwise in response to said movement being below a minimum threshold, leaving a segment of said physiological signal corresponding to the current interval as-is, otherwise replacing said segment with a default segment.

2. The method of claim 1, wherein said video device is any of: a RGB video device, a 3D video device, an infrared video device, a multi-spectral video device, a hyperspectral video device, and a hybrid device comprising any combination hereof.

3. The method of claim 1, wherein said video devices are mounted on a robotic arm.

4. The method of claim 1, wherein said first and second regions of interest are any of: the same region, overlapping regions, and different regions.

5. The method of claim 1, wherein said second region of interest is any of: face, torso, hands, arms, legs, with or without covers.

6. The method of claim 1, wherein said first and second regions of interest are isolated in said image frames using any of: pixel classification, object identification, facial recognition, color, texture, spatial features, spectral information, pattern recognition, and a user input.

7. The method of claim 1, wherein analyzing pixels of said isolated second region to identify time intervals when a movement occurred is performed by any of: object tracking, object detection, frame differencing, and a user input.

8. The method of claim 1, wherein analyzing pixels of each of said isolated second regions to identify at least one time interval when movement occurred is performed by any of:
identifying a change in center pixel locations of said isolated second region relative to a fixed position;
identifying a change in sizes of said isolated second region relative to a fixed size;
identifying a change in shapes of said isolated second region; and
identifying a residual from frame differencing.

9. The method of claim 1, wherein said desired physiological function is a cardiac function, and said processed physiological signal is a cardiac signal.

10. The method of claim 9, further comprising analyzing said cardiac signal to determine any of: heart rate variability, and cardiac pulse frequency.

11. The method of claim 9, further comprising using said cardiac signal to determine an occurrence of any of: Cardiac Arrhythmia, Cardiac Stress, Cardiac Failure, and Heart Disease.

12. The method of claim 1, wherein said desired physiological function is a respiratory function and said processed physiological signal is a respiratory signal.

13. The method of claim 12, further comprising analyzing said respiratory signal to determine any of: pulmonary volume, minute ventilation, and respiration rate.

14. The method of claim 12, further comprising using said respiratory signal to determine an occurrence of any of: Sudden Infant Death Syndrome, Respiratory Distress, Respiratory Failure, and Pulmonary Disease.

15. The method of claim 1, wherein said video is a live streaming video and said processed physiological signal is generated in real-time.

16. The method of claim 1, further comprising communicating said processed physiological signal to any of: a storage device, a display device, and a remote device over a network.

17. A system for compensating for motion induced artifacts in physiological signals obtained from multiple videos captured by multiple video imaging devices of a subject being monitored for a desired physiological function in a non-contact, remote sensing environment, the system comprising:
N video imaging devices for capturing N videos, where N≥2, each comprising a plurality of time-sequential image frames; and
a processor in communication with a memory and said storage device, said processor executing machine readable program instructions for performing the steps of:
receiving N videos, where N≥2, of a subject being monitored for a desired physiological function, each video comprising a plurality of time-sequential image frames acquired concurrently by said video devices, at least one of said videos being of a first region and at least one of said videos being of a second region, said first region being at least one area of exposed skin where a desired signal corresponding to said physiological function can be registered by a video imaging device, said second region being an area where a movement by said subject is likely to induce motion artifacts into said signal;
processing said videos to isolate pixels in said image frames associated with each of said first and second regions of interest;
processing pixels of each of said isolated first regions to obtain a composite time-series signal;
extracting, from said composite time-series signal, a physiological signal corresponding to said desired physiological function;
analyzing pixels of each of said isolated second regions to identify time intervals when movement by said subject occurred; and
for each of said identified time intervals when movement has occurred:
determining an amount of movement over the current interval; and
in response to said movement being above a maximum threshold, discarding a segment of said physiological signal corresponding to said current interval, otherwise in response to said movement being below a minimum threshold, leaving a segment of said physiological signal corresponding to the current interval as-is, otherwise replacing said segment with a default segment.

18. The system of claim 17, wherein said video device is any of: a RGB video device, a 3D video device, an infrared video device, a multi-spectral video device, a hyperspectral video device, and a hybrid device comprising any combination hereof.

19. The system of claim 17, wherein said video devices are mounted on a robotic arm.

20. The system of claim 17, wherein said first and second regions of interest are any of: the same region, overlapping regions, and different regions.

21. The system of claim 17, wherein said second region of interest is any of: face, torso, hands, arms, legs, with or without covers.

22. The system of claim 17, wherein said first and second regions of interest are isolated in said image frames using any of: pixel classification, object identification, facial recognition, color, texture, spatial features, spectral information, pattern recognition, and a user input.

23. The system of claim 17, wherein analyzing pixels of said isolated second region to identify time intervals when a movement occurred is performed by any of: object tracking, object detection, frame differencing, and a user input.

24. The system of claim 17, wherein analyzing pixels of each of said isolated second regions to identify at least one time interval when movement occurred is performed by any of:
identifying a change in center pixel locations of said isolated second region relative to a fixed position;

identifying a change in sizes of said isolated second region relative to a fixed size;

identifying a change in shapes of said isolated second region; and identifying a residual from frame differencing.

25. The system of claim 17, wherein said desired physiological function is a cardiac function, and said processed physiological signal is a cardiac signal.

26. The system of claim 25, further comprising analyzing said cardiac signal to determine any of: heart rate variability, and cardiac pulse frequency.

27. The system of claim 25, further comprising using said cardiac signal to determine an occurrence of any of: Cardiac Arrhythmia, Cardiac Stress, Cardiac Failure, and Heart Disease.

28. The system of claim 17, wherein said desired physiological function is a respiratory function and said processed physiological signal is a respiratory signal.

29. The system of claim 28, further comprising analyzing said respiratory signal to determine any of: pulmonary volume, minute ventilation, and respiration rate.

30. The system of claim 28, further comprising using said respiratory signal to determine an occurrence of any of: Sudden Infant Death Syndrome, Respiratory Distress, Respiratory Failure, and Pulmonary Disease.

31. The system of claim 17, wherein said video is a live streaming video and said processed physiological signal is generated in real-time.

32. The system of claim 17, further comprising communicating said processed physiological signal to any of: a storage device, a display device, and a remote device over a network.

* * * * *